Aug. 26, 1958   J. T. COMBS   2,848,976
ANIMAL BED
Filed Nov. 13, 1956

(ENLARGED)

United States Patent Office 2,848,976
Patented Aug. 26, 1958

2,848,976

ANIMAL BED

Jesse T. Combs, Dania, Fla., assignor to Clifford Carlock, Betterton, Md.

Application November 13, 1956, Serial No. 621,943

4 Claims. (Cl. 119—1)

This invention relates to a new and improved animal bed and, in particular, to an animal bed of exfoliated vermiculite. The invention pertains especially to a bed for bedding livestock, such as horses and cattle.

This application is a continuation-in-part of my patent applications Serial Number 365,997, filed July 3, 1953, and Serial Number 376,844, filed August 27, 1953, both now abandoned.

The invention has for its object the provision of an animal bed having a number of advantages over the conventional animal beds for bedding livestock, i. e., livestock which bed down. A very important feature is that vermiculite is fireproof, eliminating a major at least contributing cause to the great annual loss of valuable livestock, especially thoroughbred race horses.

An outstanding result of the invention is that vermiculite provides remarkable protection of the feet of such livestock, and especially horses.

A further important result is that horses, particularly, do not eat the vermiculite. One consequence is that valuable race horses need not be muzzled before racing. In contrast, horses eat the conventional straw and sawdust bedding, the latter being indigestible and thus additionally disadvantageous.

These advantages are obtained while providing a soft and comfortable bed of the vermiculite, which also does not cause irritation or allergic responses. In addition, the vermiculite is highly absorbent, more so than straw.

Other advantages are that the vermiculite is insect and rodent-proof, it is light in weight for ease of handling, and the amount of daily replacement is reduced, reducing storage space requirements. These and other objects and advantages of the invention will be apparent on reference to the specification.

The accompanying drawing shows one selected adaptation of the invention, and the views therein are as follows.

Figure 1:
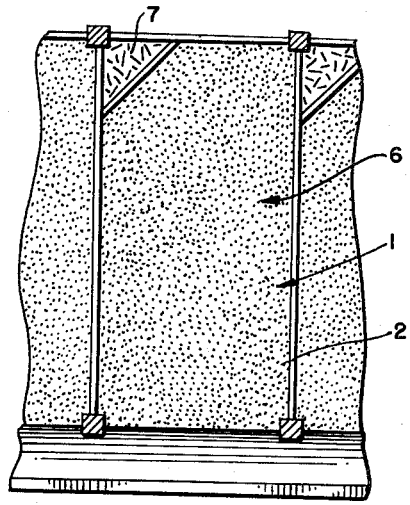
Figure 1 is a top plan view of a conventional horse stall to which the invention is applied.

Innumerable attempts have been made to discover a bedding for high priced race horses in an attempt to alleviate fires in barns and stables, which have caused the death of many costly race horses during the past few years at many of the leading race tracks throughout the country. Straw or hay, as conventionally used in barns and stables, has been primarily responsible for these fires and resultant deaths.

A bedding for these fine thoroughbreds must be resilient and soft to lie upon to permit the animals to rest comfortably. The bedding must be non-toxic in case the animal should eat some of it. It should be rodent-proof to make it more sanitary and, above all, it should be fire proof or fire retardant. Also, it should be of such a character that it will be competitive in price with conventional bedding like straw. Moreover, it is desirable that the bedding, after use, have the same end use or purpose as straw, such as being capable of use as a fertilizer, particularly in mushroom gardens.

The present invention embodies all of the advantages described above and still eliminates all of the inherent disadvantages of the conventional materials. The material which has been discovered to be uniquely suitable as an animal bed is exfoliated expanded vermiculite. A vermiculite which has been found to be exceptionally desirable is that known as African vermiculite.

The vermiculites are hydrated, mica-like minerals, most commonly resulting from the hydration of normal micas by loss of alkali and gain of water. Their essential composition is that of complex aluminium-iron-magnesium silicates, with the possibility of isomorphous replacements. They are characterized by their mica-like structure and the property of exfoliating strongly when heated, forming accordion- or worm-like piles with loss of water. The expansion is axial, normal to the basal cleavage, the length or thickness of the grains extending about 12 to 30 or more times. The volume of a mass of grains such as commercially prepared, graded flakes, increases usually about 15 times on exfoliation.

The preferred African vermiculite is obtained from the Palabora deposits in South Africa. A typical analysis is as follows:

| | |
|---|---|
| $SiO_2$ | 39.37 |
| $TiO_2$ | 1.25 |
| $Al_2O_3$ | 12.08 |
| $Fe_2O_3$ | 5.45 |
| FeO | 1.17 |
| MnO | 0.30 |
| MgO | 23.37 |
| CaO | 1.46 |
| $Na_2O$ | 0.80 |
| $K_2O$ | 2.46 |
| $H_2O+105°$ C. | 5.18 |
| $H_2O-105°$ C. | 6.02 |
| $CO_2$ | 0.60 |
| $P_2O_5$ | 0.15 |
| $Li_2O$ | 0.03 |
| $ZrO_2$ | Nil |
| $Cr_2O_3$ | Nil |
| $V_2O_3$ | Nil |
| NiO | Nil |
| CoO | Nil |
| BaO | 0.03 |
| Cl | 0.02 |
| F | Nil |
| $SO_3$ | 0.02 |
| S | 0.18 |
| Total | 99.94 |
| O equiv. to S in pyrite | 0.08 |
| Corrected total | 99.86 |

Other samples show higher values of $H_2O+105°$ C. with correspondingly lower alkalies and somewhat lower $SiO_2$, but this analysis is otherwise fairly typical.

This material forms accordion-like piles on expansion. The completeness of expansion is preferably about 92 to 97 percent. Coarse or relatively large expanded particles or piles are preferred for the animal bed, e. g., having a large or preponderant volume proportion of particles having one and preferably two dimensions of at least about ¼ inch and which may range up to ½ to 1 inch or more. The more important condition is that fines be excluded insofar as possible.

The invention, then, provides a new and improved bed and stall for bedding livestock, and new methods of making a livestock bed and of bedding the livestock. The bed consists essentially of exfoliated expanded vermiculite By reference to a livestock bed it is intended to refer to that provided for the animal to lie on, as distinguished from a litter for waste products.

Figure 2:
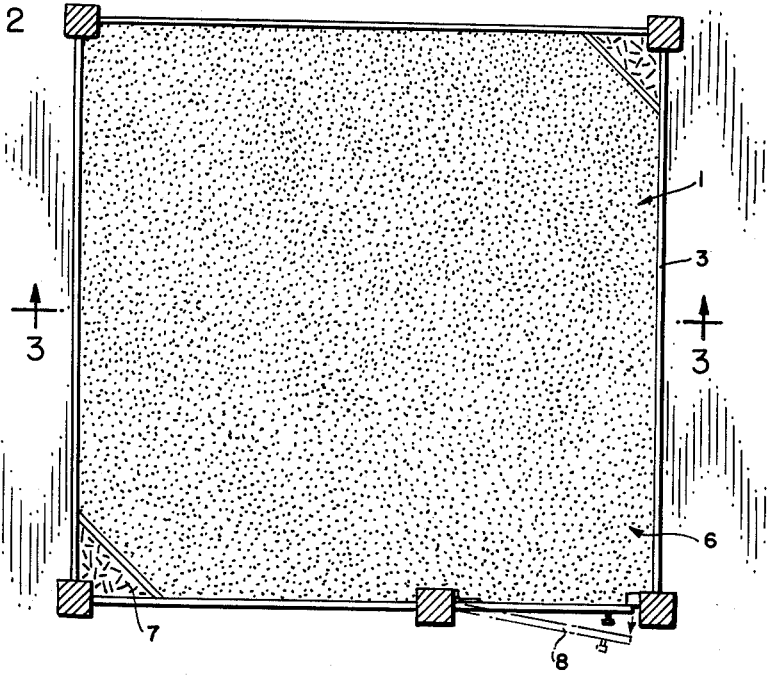
Figure 2 is a similar view of a box stall embodying the invention.
Figure 3:
Figure 3 is an enlarged detail sectional view on the line 3—3 of Figure 2; a sectional view transversely through Figure 1 being the same as Figure 3.

Referring to the drawings, the exfoliated vermiculite is applied to the stall 1, whether the stall be a regular stall 2, Figure 1, or a box stall 3, Figure 2. Stalls usually have a solid base 4, Figure 3, such as the concrete illustrated, or brick, floored over with planks or boards 5, straw or hay previously being applied over the flooring 5.

In carrying out the provisions of the present invention, exfoliated vermiculite 6 is applied on top of the boards 5, but in case there is no planking or flooring over the base, it is applied directly on top of the base which then serves as the floor.

Preferably, the vermiculite is cleaned by screening or cycloning to eliminate the dust, leaving it in somewhat lump form. The somewhat lumpy vermiculite is very soft and flattens to some extent when pressure is applied, as when the animal is lying upon it. It may be spread to any thickness desired, but good results occur when the thickness is substantial and is at least two inches, preferably at least three inches. It is applied as the bedding by dumping out of sacks, spreading it with a shovel, raking the same evenly, or applying it in any way which is convenient. A good bed is provided with a layer of about three to four inches, and the bed is at least the size of the animal. The vermiculite is spongy and absorbs considerable moisture, making an excellent bed. Manure which drops on the bed is removed, and the manure laden vermiculite is excellent for fertilizer, particularly in mushroom culture. The material, being absorbent to some extent, retains moisture when applied for fertilizing purposes. The vermiculite removed is replaced, and the stall is cleaned and the vermiculite changed at weekly intervals.

The drawing shows one of the several adaptations to which the invention may be applied, that is, its use as a bedding for horses. Figure 1 discloses a conventional open stall in a barn or stable, while Figure 2 shows a typical box stall. The box stall is provided with a trough or bin 7 completely enclosed except for the opening which is closed by a door or gate 8.

As noted above, the bedding of livestock on vermiculite results in remarkably good condition of their feet. Horse's feet are normally cleaned out daily when they are bedded on conventional materials such as straw, to prevent thrush, bacterial invasion or degeneration of the frog or sole. Especially, prudent persons would not think of leaving the feet uncared for over long periods of time. Yet when three horses were placed on the African exfoliated vermiculite for 10 months, during which they were not permitted on pasture, and their feet were cleaned but twice during the year, when it was necessary to trim them, the feet were in perfect shape. There was no evidence of any of the above conditions. Additional horses were then tested for another 10 months, and the feet were trimmed and cleaned three times in that period. The same excellent results were found.

The exfoliated vermiculite may also be treated with a medicament, such as iodine to provide further protection against thrush. The medicament is advantageously dissolved in a non-toxic solvent. It is common to treat the disease with an application of iodine and in some instances to mix iodine with glycerine. It is therefore deemed highly desirable to treat the vermiculite of the present invention when used as a bedding material either with the iodine or glycerine, or both, which will thus act in some measure as a preventative for the thrush disease.

It has been determined also that propylene glycol may be effective as a carrier for the iodine in assisting the penetration of the iodine in its application to the horse's hoof. Since propylene glycol and glycerine are polyhydric alcohols, there may be many more in that group such as ethylene glycol which are also suitable for the purpose outlined above.

The present invention, therefore, also contemplates the treatment of exfoliated vermiculite with a small minor effective proportion of iodine and thus have a beneficial effect upon an animal when the treated material is used as a bedding. The addition of the polyhydric alcohol also acts to prevent the presence of dust in the bed.

It is preferred that the iodine solution with which the vermiculite is treated be about a 0.5% solution, and preferably a maximum of about a 3% solution. Such a solution can be made in the manner of the commercially available iodine tinctures. The iodine solution may be applied directly to the vermiculite, and the selected polyhydric alcohol may also be applied in a separate step. It is preferred, however, that the two solutions be combined and then applied to the bedding material such as by spraying thereon or by any other suitable means. A tincture of iodine may be combined with the selected polyhydric alcohol preferably either propylene glycol or glycerine and the resulting solution then applied to the bedding material.

Another method which may be used to make the final solution is to dissolve iodine crystals in the propylene glycol or glycerine and then add to water in the proper amount so that the desired dilution of the iodine is obtained. For example, 14 grams of iodine crystals may be dissolved in propylene glycol or glycerine and thereafter added to water to produce a total solution of 1,000 cc., and this will result in a solution adapted to be sprayed or otherwise applied onto a predetermined quantity of the vermiculite. Only a limited quantity of the solution is applied, sufficient to achieve its purpose while below a quantity which might produce an adverse effect or detract from the beneficial properties of the vermiculite.

The invention thus provides a number of important advantages. It provides a long-sought solution to the problem of furnishing a fireproof bedding. Not only does the bed supply the functions of conventional livestock beds, but it eliminates their disadvantages and provides significant advantages thereover. A very surprising protection of the feet of the livestock is achieved.

The invention is hereby claimed as follows:

1. A livestock stall having means defining a bedding inclosure, said inclosure having a layer of exfoliated expanded African vermiculite, at least two inches in thickness and being composed of particles having a minimum dimension of ¼ inch.

2. A livestock stall as defined in claim 1 wherein said vermiculite is treated with iodine.

3. A livestock stall as defined in claim 1 wherein said vermiculite is treated with a polyhydric alcohol.

4. A livestock stall as defined in claim 1 wherein said vermiculite is treated with a mixture of iodine and a polyhydric alcohol.

References Cited in the file of this patent

UNITED STATES PATENTS

| | | |
|---|---|---|
| TM 408,203 | | July 25, 1944 |
| 2,220,666 | Murdock | Nov. 5, 1940 |
| 2,376,672 | Dreyling | May 22, 1945 |
| 2,659,345 | Herbert | Nov. 17, 1953 |
| 2,712,811 | Dowell, Jr. | July 12, 1955 |

OTHER REFERENCES

Sani-Flor, Publication SF-1, Universal Zonalite Insulation Co., Chicago, Illinois.